United States Patent
Li et al.

(10) Patent No.: US 10,469,732 B2
(45) Date of Patent: Nov. 5, 2019

(54) METHOD AND DEVICE FOR CONTROLLING ELECTRONIC APPARATUS, AND ELECTRONIC APPARATUS

(71) Applicant: GUANGDONG OPPO MOBILE TELECOMMUNICATIONS CORP., LTD., Dongguan, Guangdong (CN)

(72) Inventors: Xiaopeng Li, Dongguan (CN); Xinlan He, Dongguan (CN); Shijie Zhuo, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 129 days.

(21) Appl. No.: 15/791,925

(22) Filed: Oct. 24, 2017

(65) Prior Publication Data

US 2018/0255227 A1 Sep. 6, 2018

(30) Foreign Application Priority Data

Mar. 6, 2017 (CN) .......................... 2017 1 0127764

(51) Int. Cl.
*H04N 5/232* (2006.01)

(52) U.S. Cl.
CPC ............................. *H04N 5/23212* (2013.01)

(58) Field of Classification Search
CPC ................................................ H04N 5/23212
USPC ....................................................... 348/349
See application file for complete search history.

(56) References Cited

U.S. PATENT DOCUMENTS

| 4,972,221 | A | 11/1990 | Ohnuki et al. | |
| 9,007,514 | B2* | 4/2015 | Nakamura | H04N 5/23212 348/349 |
| 9,247,123 | B2* | 1/2016 | Kobayashi | H04N 5/23219 |
| 9,264,600 | B2* | 2/2016 | Uenishi | H04N 5/23212 |
| 9,621,788 | B2* | 4/2017 | Tsuji | G06F 3/0412 |
| 2005/0018071 | A1* | 1/2005 | Yasuda | H04N 5/23212 348/345 |
| 2009/0245778 | A1 | 10/2009 | Shibuno et al. | |
| 2016/0156833 | A1* | 6/2016 | Tsuji | G06F 3/0412 348/345 |

FOREIGN PATENT DOCUMENTS

| CN | 103685943 A | 3/2014 |
| CN | 104168425 A | 11/2014 |
| CN | 105872378 A | 8/2016 |
| CN | 106375671 A | 2/2017 |
| CN | 106993129 A | 7/2017 |

* cited by examiner

*Primary Examiner* — Lin Ye
*Assistant Examiner* — Chan T Nguyen
(74) *Attorney, Agent, or Firm* — Hodgson Russ LLP (57) ABSTRACT

A control method of an electronic apparatus includes determining whether an imaging device is in focus when an imaging command is received; deciding a threshold of an imaging wait time based on a current frame rate of the imaging device and a preset focusing frame number when the imaging device is not in focus; controlling a focusing process of the imaging device when the imaging wait time is less than the threshold; and controlling the imaging device for imaging when the imaging wait time being greater than or equal to the threshold. A control device for carrying out the control method and an electronic apparatus having the control device are also provided.

15 Claims, 11 Drawing Sheets

METHOD AND DEVICE FOR CONTROLLING ELECTRONIC APPARATUS, AND ELECTRONIC APPARATUS

CROSS REFERENCE TO RELATED APPLICATION

This application is a non-provisional patent application, which claims priority to Chinese Application No. 201710127764.0, filed on Mar. 6, 2017. The entire disclosure of the above application is incorporated herein by reference.

BACKGROUND

1. Field

The present disclosure relates to imaging technology, and in particular to a control method, control device, and an electronic apparatus.

2. Description of Related Art

If a camera receives an imaging command while the camera is focusing, an imaging process is usually performed after a delay. The delay is set when the camera is manufactured. If the delay is too short, the camera easily forms an image when the focusing is not complete, resulting in less than desired image quality. If the delay is too long, the camera always has to wait before the focusing is completed, thereby affecting working efficiency of the camera.

The present disclosure is intended to at least address one of the technical problems that exist in the prior art. Therefore, an embodiment of the present disclosure provides a control method, control device, and electronic apparatus.

BRIEF DESCRIPTION OF THE DRAWINGS

The aforementioned and/or additional aspects and advantages of the present disclosure will become apparent and be readily understood from the following description taken in conjunction with the accompanying drawings.

DETAILED DESCRIPTION OF THE PREFERRED EMBODIMENTS

Embodiments of the present disclosure are described in detail below, and implementations of the embodiments are shown in the accompanying drawings, wherein same or similar reference numerals refer to same or similar elements or elements having the same or similar functions throughout. The embodiments described below with reference to the accompanying drawings are illustrative only, merely for the purpose of explaining the present disclosure, and are not to be construed as limiting the present disclosure.

Figure 1:
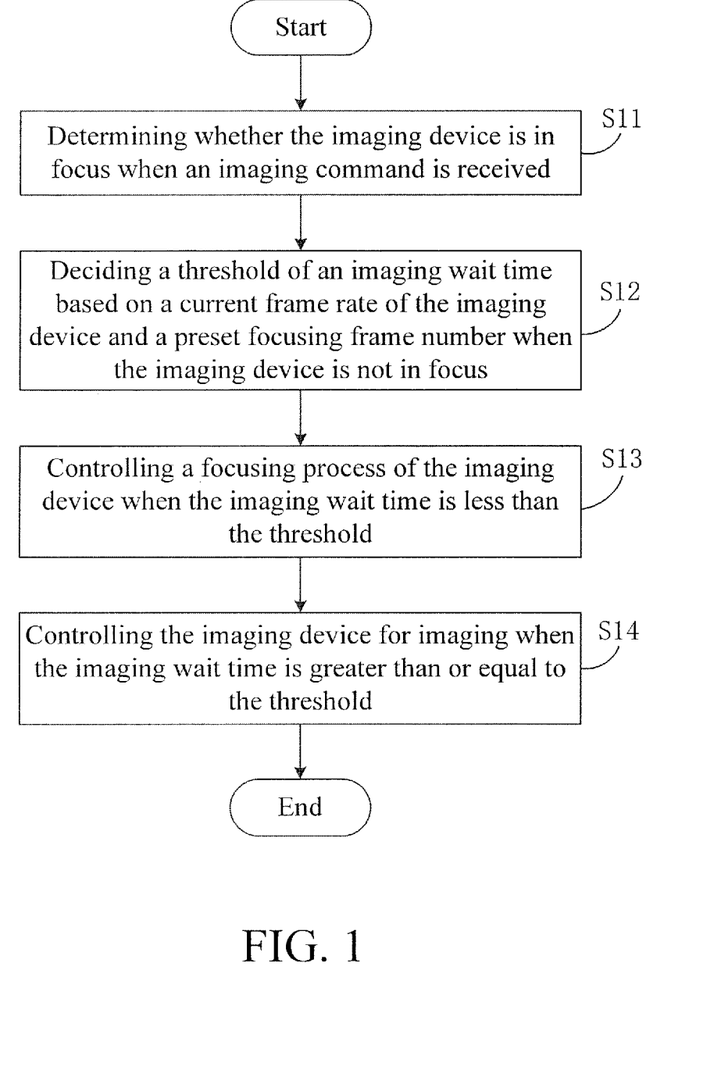
FIG. 1 is a schematic flowchart of a control method of an embodiment of the present disclosure.

Referring to FIG. 1, a control method of an embodiment of the present disclosure may be configured to use a control method control an electronic apparatus. The electronic apparatus includes an imaging device. The control method comprises follows.

In block S11, determining whether the imaging device is in focus when an imaging command is received;

In block S12, deciding a threshold of an imaging wait time based on a current frame rate of the imaging device and a preset focusing frame number when the imaging device is not in focus;

In block S13, controlling a focusing process of the imaging device when the imaging wait time is less than the threshold; and In block S14, controlling the imaging device for imaging when the imaging wait time is greater than or equal to the threshold.

Figure 2:
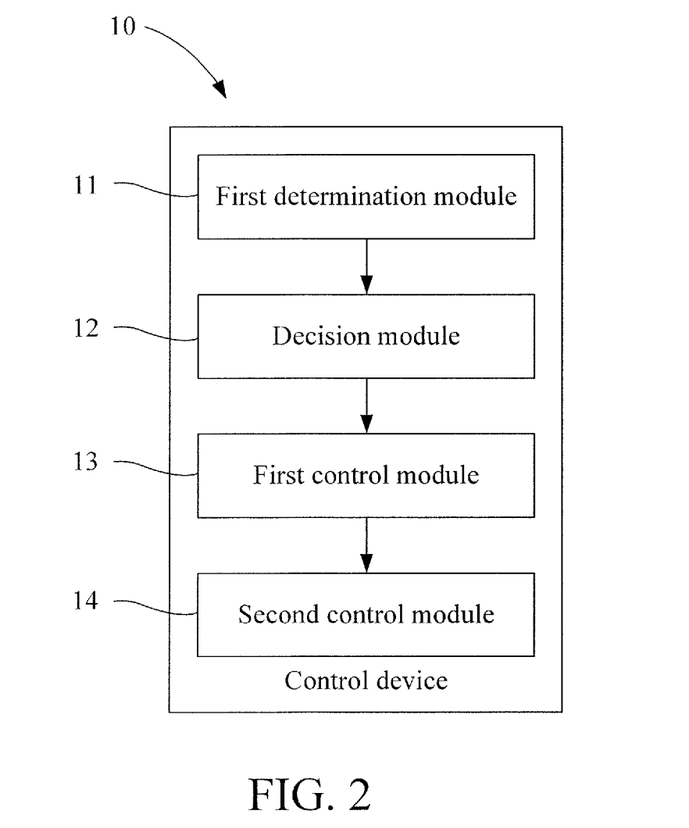
FIG. 2 is a schematic functional module diagram of a control device of an embodiment of the present disclosure.
Figure 3:
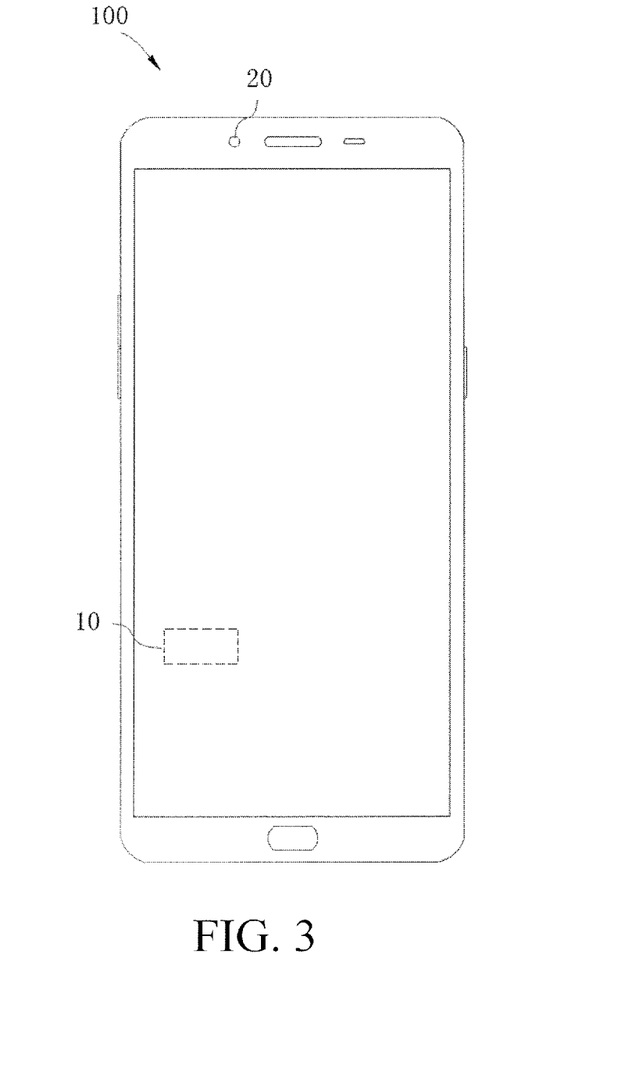
FIG. 3 is a schematic structure diagram of an electronic apparatus of an embodiment of the present disclosure.

Referring to FIG. 2, a control device 10 of an embodiment of the present disclosure includes a first determination module 11, a decision module 12, a first control module 13, and a second control module 14. Referring to FIG. 3, the control device 10 of the embodiment of the present disclosure may be configured to control an electronic apparatus 100. The electronic apparatus 100 may also include an imaging device.

The control device 10 has a first determination module 11, a decision module 12, a first control module 13, and a second control module 14. The first determination module 11 is configured to determine whether the imaging device is in focus when an imaging command is received. The decision module 12 is configured to decide a threshold of an imaging wait time based on a current frame rate of the imaging device and a preset focusing frame number when the imaging device is not in focus. The first control module 13 is configured to control a focusing process of the imaging device 20 when the imaging wait time is less than the threshold. The second control module 14 is configured to control the imaging device 20 for imaging when the imaging wait time is greater than or equal to the threshold.

In other words, the control method of the embodiment of the present disclosure may be implemented by the control device 10 of the embodiment of the present disclosure. The block S11 may be implemented by the first determination module 11, the block S12 may be implemented by the decision module 12, the block S13 may be implemented by the first control module 13, and the block S14 may be implemented by the second control module 14.

In some embodiments, the control device 10 of the embodiments of the present disclosure may be applied to the electronic apparatus 100 of the embodiments of the present disclosure. Namely, the electronic apparatus 100 of the embodiments of the present disclosure includes the control device 10 of the embodiments of the present disclosure.

The control method, control device 10, and electronic apparatus 100 of the embodiments of the present disclosure decides an imaging wait time required for imaging based on a current frame rate and a preset focusing frame number when the imaging device 20 is not in focus, thereby the imaging wait time is reasonable for acquiring an image with a higher quality to enhance user experience.

If an imaging command is received when the imaging device 20 is not in focus, in order to ensure quality of images, an imaging process generally performed by the imaging device 20 when the imaging wait time is greater than or equal to a threshold. The user experience will be affected by the imaging wait time too long or too short. Thus, the threshold of the imaging wait time may be determined based on the current frame rate of the imaging device 20 and the preset focusing frame number, thereby balancing requirements of a plurality of aspects such as the imaging wait time and an image quality.

In some embodiments, the electronic apparatus 100, includes mobile phones, tablet computers, smart watches, notebook computers, smart bracelets, smart glasses, or smart helmets. In this embodiment of the present disclosure, the electronic apparatus 100 is a smart phone.

In some embodiments, the imaging device 20, includes front cameras or rear cameras. In this embodiment of the present disclosure, the imaging device 20 is a front camera.

Figure 4:
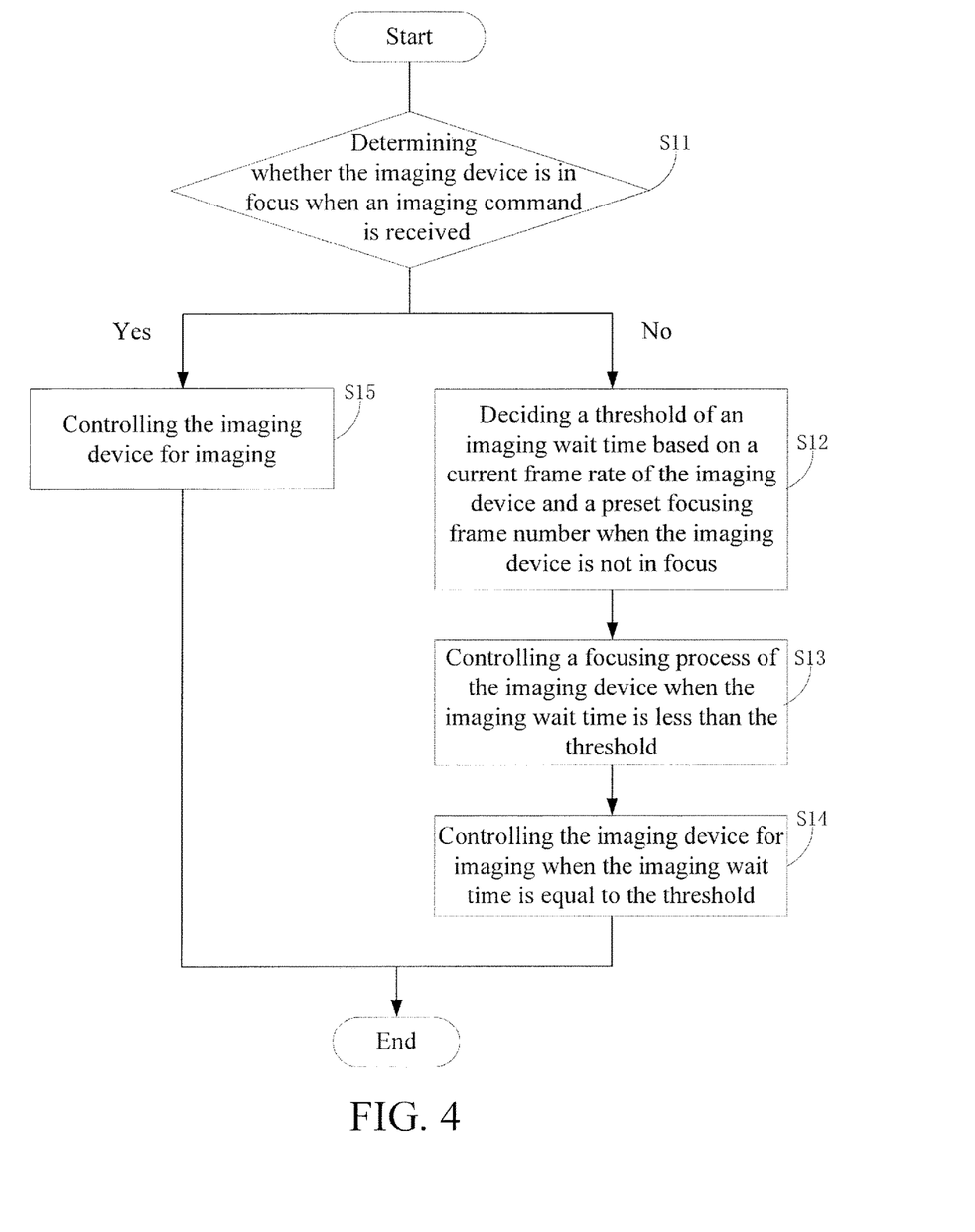
FIG. 4 is a schematic flowchart of the control method of some embodiments of the present disclosure.

Referring to FIG. 4, in some embodiments, the control method includes the follows.

In block S15, controlling the imaging device for imaging when the imaging device is in focus.

Figure 5:
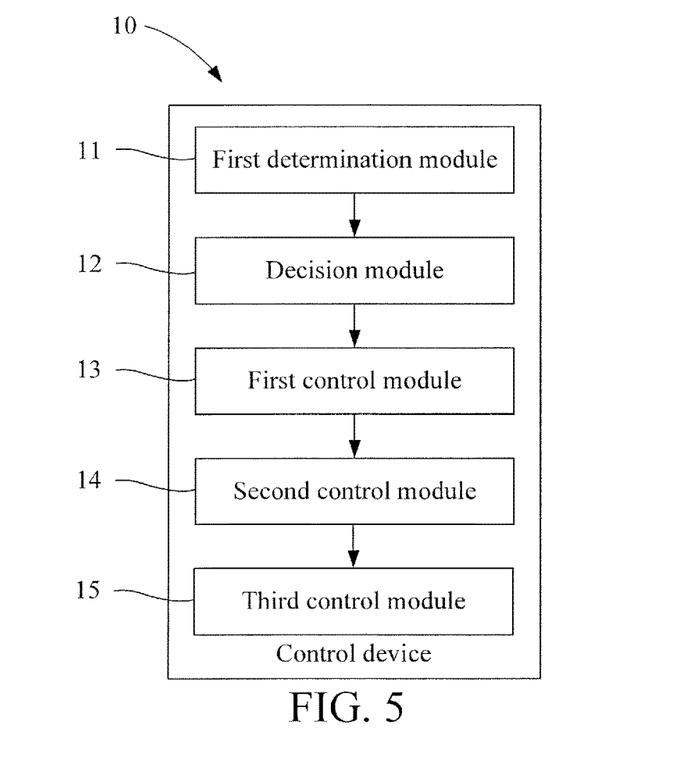
FIG. 5 is a schematic functional module diagram of the control device of some embodiments of the present disclosure.

Referring to FIG. 5, in some embodiments, the control device 10 further includes a third control module 15, which is configured to control the imaging device for imaging when the imaging device is in focus.

In other words, the block S15 may be implemented by the third control module 15.

Therefore, if the imaging device 20 is already focused when the imaging device 20 receives the imaging command, then an imaging process is directly performed by the imaging device, thereby without going by the imaging wait time, the speed of imaging is speed up, and user experience is enhanced.

Figure 6:
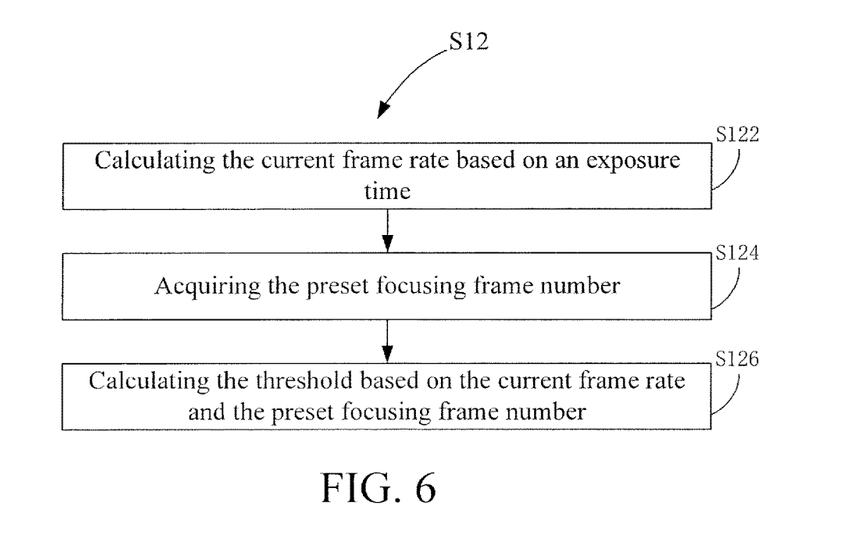
FIG. 6 is a schematic flowchart of the control method of some embodiments of the present disclosure.

Referring to FIG. 6, in some embodiments, the block S12 includes the follows.

In block S122, calculating the current frame rate based on an exposure time.

In block S124, acquiring the preset focusing frame number.

In block S126, calculating the threshold based on the current frame rate and the preset focusing frame number.

Figure 7:
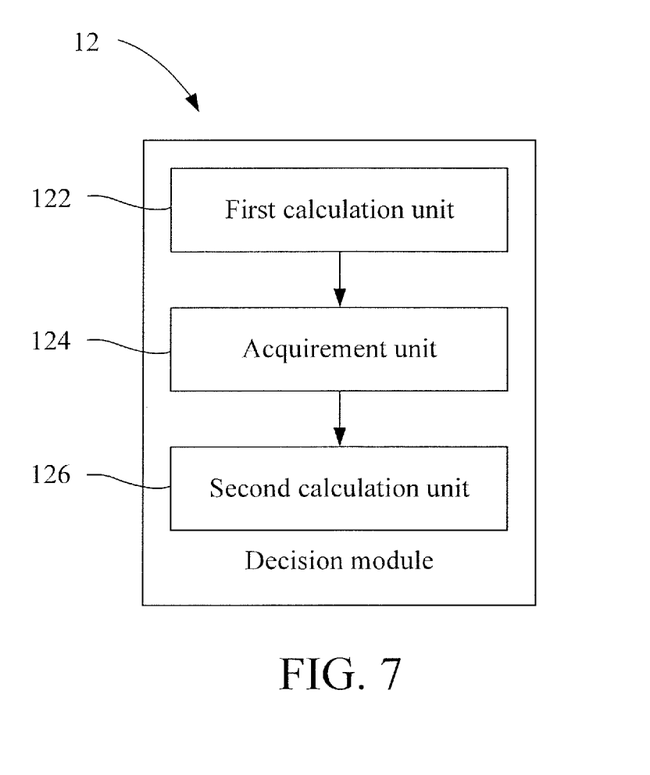
FIG. 7 is a schematic functional module diagram of a decision module of some embodiments of the present disclosure.

Referring to FIG. 7, in some embodiments, the decision module 12 includes a first calculation unit 122, an acquirement unit 124, and a second calculation unit 126. The first calculation unit 122 is configured to calculate the current frame rate based on an exposure time. The acquirement unit 124 is configured to acquire the preset focusing frame number. The second calculation unit 126 is configured to calculate the threshold based on the current frame rate and the preset focusing frame number.

In other words, the block S122 may be implemented by the first calculation unit 122, the block S124 may be implemented by the acquirement unit 124, and the block S126 may be implemented by the second calculation unit 126.

Thus, under different conditions such as differential ambient brightness, the time requested for focusing by the imaging device 20 may be ensured, thereby ensuring the threshold of the imaging wait time.

In some embodiments, the imaging device 20 may be configured to an automatic exposure mode.

Thus, the current frame rate of the imaging device 20 will be changed with a variety of the ambient brightness. For example, under the condition that the ambient brightness is higher, the exposure time of the imaging device 20 is shorter and the current frame rate is higher; and under the condition that the ambient brightness is lower, the exposure time of the imaging device 20 is increased and the current frame rate is lower.

In some embodiments, a focusing mode may be a contrast focusing mode. The contrast focusing mode decides a focus position of the imaging device 20 by comparing contrast ratios between each of the frames. Thus, an average frame number requested by the contrast focusing mode may be calculated based on a lot of experimental data. In one example, the average frame number requested by the contrast focusing mode is 14 or 15 frames. Namely, the preset focusing frame number may be set to 14 or 15 frames.

In some embodiments, the threshold of the imaging wait time may be proportional to the preset focusing frame number, and may be inversely proportional to the current frame rate of the imaging device 20. For instance, if the preset focusing frame number is 15 frames and the current frame rate of the imaging device 20 is 15 frames per second, then the focusing time is 1 second, that is, the threshold of the imaging wait time being 1 second.

Therefore, the threshold of the imaging wait time may be decided and set based on the preset focusing frame number and the current frame rate.

Figure 8:
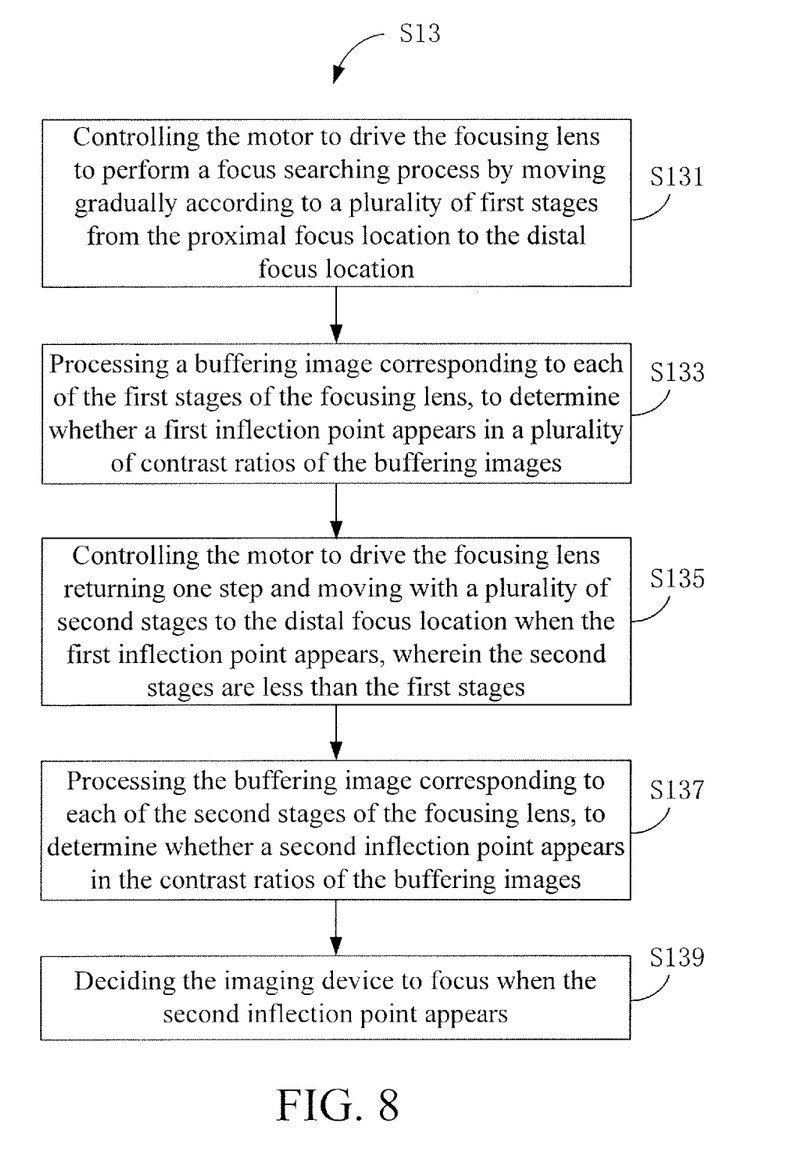
FIG. 8 is a schematic flowchart of the control method of some embodiments of the present disclosure.
Figure 9:
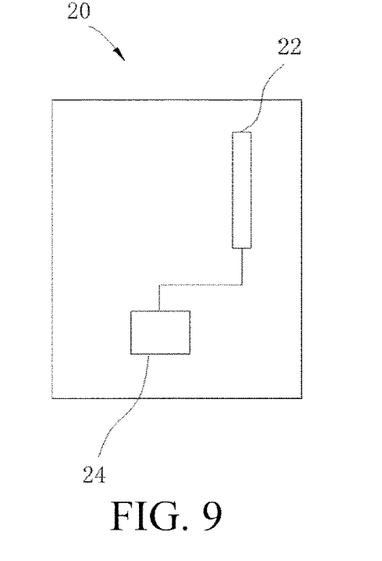
FIG. 9 is a schematic structure diagram of an imaging device of some embodiments of the present disclosure.

Referring to FIG. 8, in some embodiments, the block S13 includes blocks S131, S133, S135, S137, and S139. Referring to FIG. 9, in some embodiments, the imaging device 20 includes a focusing lens 22 and a motor 24 configured to implement a focusing by driving the focusing lens 22 to move between a proximal focus location and a distal focus location along an axis of light. Referring to FIG. 8 again, the block S13 includes the follows.

In block S131, controlling the motor to drive the focusing lens to perform a focus searching process by moving gradually according to a plurality of first stages from the proximal focus location to the distal focus location.

In block S133, processing a buffering image corresponding to each of the first stages of the focusing lens, to determine whether a first inflection point appears in a plurality of contrast ratios of the buffering images.

In block S135, controlling the motor to drive the focusing lens returning one step and moving with a plurality of second stages to the distal focus location when the first inflection point appears, wherein the second stages are less than the first stages.

In block S137, processing the buffering image corresponding to each of the second stages of the focusing lens, to determine whether a second inflection point appears in the contrast ratios of the buffering images.

In block S139, deciding the imaging device to focus when the second inflection point appears.

Figure 10:
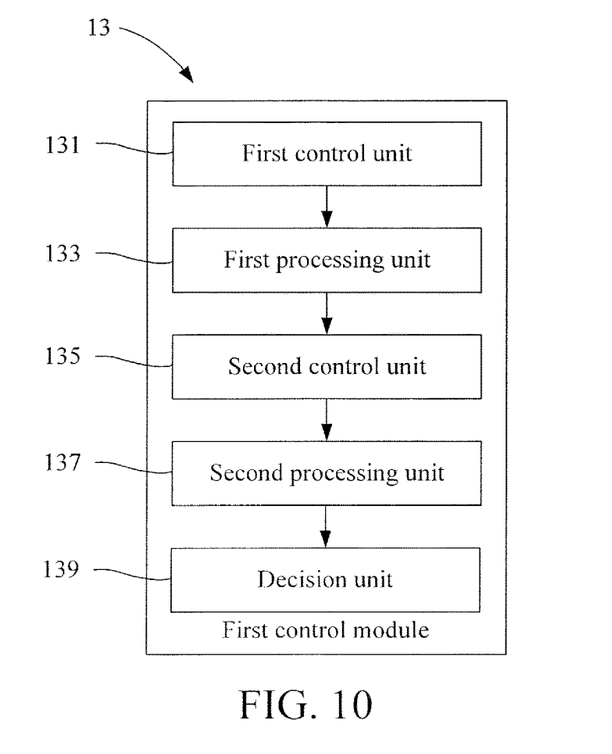
FIG. 10 is a schematic functional module diagram of a first control module of some embodiments of the present disclosure.

Referring to FIG. 10, in some embodiments, the first control module 13 includes a first control unit 131, a first processing unit 133, a second control unit 135, a second processing unit 137, and a decision unit 139. The first control unit 131 is configured to control the motor 24 to drive the focusing lens 22 performing a focus searching process by moving gradually according to a plurality of first stages from the proximal focus location to the distal focus location. The first processing unit 133 is configured to process a buffering image corresponding to each of the first stages of the focusing lens 22, to determine whether a first inflection point appears in a plurality of contrast ratios of the buffering images. The second control unit 135 is configured to control the motor 24 to drive the focusing lens 22 returning one stage and moving with a plurality of second stages to the distal focus location when the first inflection point appears, wherein the second stages are less than the first stages. The second processing unit 137 is configured to process the buffering image corresponding to each of the second stages of the focusing lens 22, to determine whether a second inflection point appears in the contrast ratios of the buffering images. The decision unit 139 is configured to decide the imaging device 20 focus when the second inflection point appears.

In other words, the block S131 may be implemented by the first control unit 131, the block S133 may be implemented by the first processing unit 133, the block S1135 may be implemented by the second control unit 135, the block S137 may be implemented by the second processing unit 137, and the block S139 may be implemented by the decision unit 139.

Therefore, the imaging device 20 may be controlled for focusing, finally acquiring the focus position of the imaging device 20.

The inflection points refer to a maximum value point of a plurality of contrast ratios corresponded to a plurality of buffering images. Since the motor 24 drives the movement of the focusing lens 22, thereby changing the imaging device 20 from a non-focus state to a focus state, and then changing the focus state to the non-focus state. In the whole process, the contrasts of the buffering images are increased firstly and then reduced. Thus, one inflection point appears, that is, the maximum value point, at this moment, the imaging device 20 may be considered to be the focus state. The first inflection point refers to a maximum value point of the contrast ratio of the buffering image corresponded to the focusing lens 22 moved with the first stages. The second inflection point refers to a maximum value point of the contrast ratio of the buffering image corresponded to the focusing lens 22 moved with the second stages.

The proximal focus location and the distal focus location are referred to a start point and an end point of the movement of the focusing lens 22, respectively. In a process of the focusing lens 22 moved with the first stages, if the contrast ratio of the corresponding buffering image appears the first reflection point, it may be determined to an initially focus of the imaging device 20. In order to enhance an accuracy of focusing, the focusing lens 22 is moving with the second stages after returning one stage. Since the second stages are less than the first stages, the focus position of the imaging device 20 is closer to the exact focus position when the second inflection point appears, it may be considered that the imaging device 20 already precisely in focus.

Figure 11:
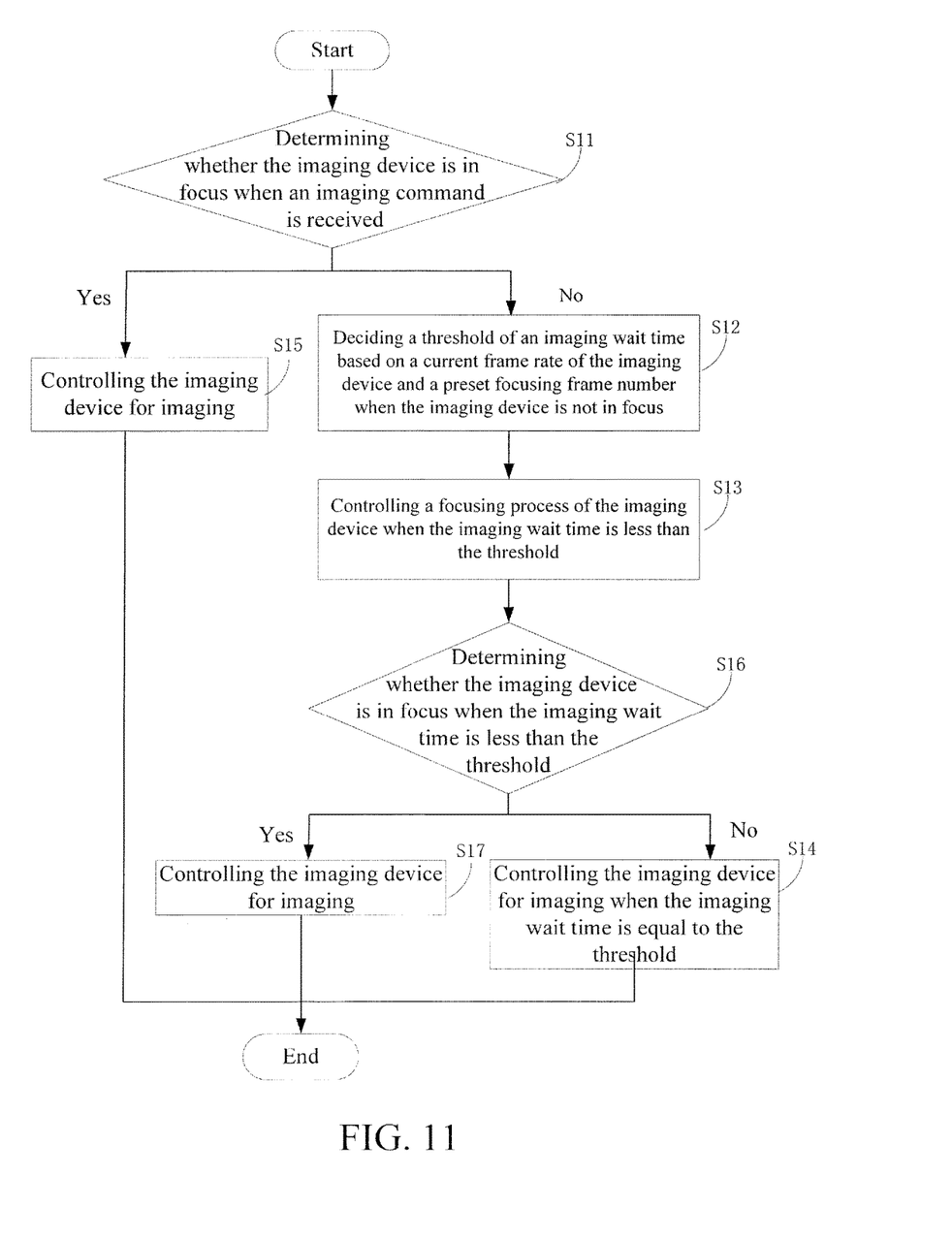
FIG. 11 is a schematic flowchart of the control method of some embodiments of the present disclosure.

Referring to FIG. 11, in some embodiments, when the imaging wait time is less than the threshold, the control method further includes the follows.

In block S16, determining whether the imaging device is in focus.

In block S17, controlling the imaging device for imaging when the imaging device is in focus.

Figure 12:
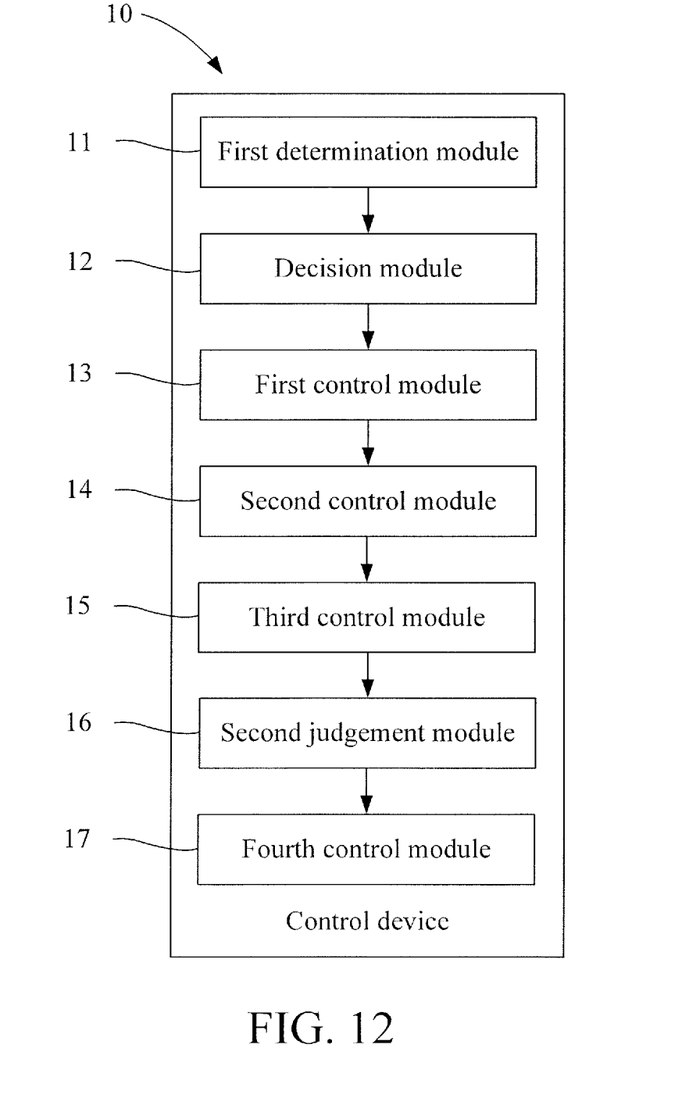
FIG. 12 is a schematic functional module diagram of the control device of some embodiments of the present disclosure.

Referring to FIG. 12, in some embodiments, the control device further includes a second determination module 16 and a fourth control module 17. The second determination module 16 is configured to determine whether the imaging device is in focus. The fourth control module 17 is configured to control the imaging device for imaging when the imaging device is focus.

Therefore, when the imaging device in focus, the control device 10 may directly control the imaging device 20 for imaging, and the imaging is not necessary after the imaging wait time is greater than or equal to the threshold, thereby avoiding unnecessary imaging wait time and speeding up the imaging speed of the imaging device 20.

Figure 13:
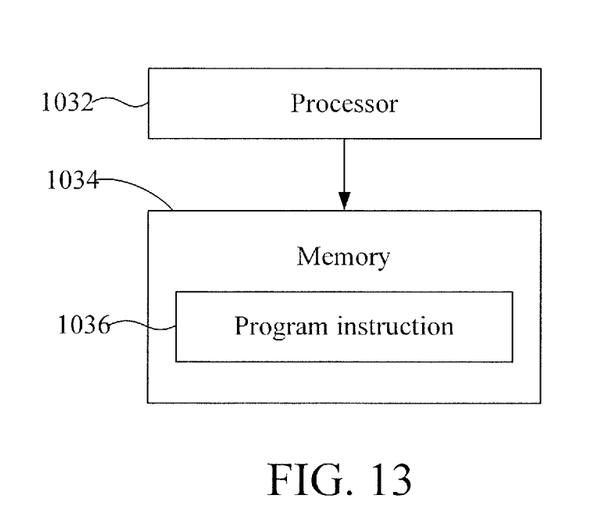
FIG. 13 is an illustrative structural diagram of a control device of some embodiments of the present disclosure.

FIG. 13 is an illustrative structural diagram of a control device of some embodiments of the present disclosure. The control device (e.g., an imaging control device) includes a processor 1302 (e.g., a single micro-processor, a combination of a plurality of micro-processors, a cloud-computing processing platform, etc.) and a memory 1304 (e.g., a single non-volatile computer storage medium, a combination of a plurality of non-volatile computer storage mediums, a cloud-computing storage platform, etc.). The processor 1302 is connected with the memory 1304. The memory 1304 includes at least one program instruction 1306 executable by the processor 1302. The at least one program instruction 1306 includes computerized codes that are configured to cause the processor 1302 for carrying out the operations of the above modules and units of some embodiments of the present disclosure, such as configured to cause the processor 1302 to execute program codes for running operations of the first determination module 11, the decision module 12, the first control module 13, the second control module 14, the third control module 15, the first calculation unit 122, the acquirement unit 124, the second calculation unit 126, the first control unit 131, the first processing unit 133, the second control unit 135, the second processing unit 137, the decision unit 139, the second determination module 16, and the fourth control module 17.

In the description of embodiments of the present disclosure, the terms "first" and "second" are merely used for illustrating purposes, and are not to be construed as indicating or imposing a relative importance or an implied indication of a number of technical characteristics indicated. Thus, a characteristic that defines a "first" and "second" may expressly or implicitly include one or more of the characteristics. In the description of the embodiments of the present disclosure, the meaning of "plural" is two or more, unless otherwise specifically defined.

In the description of the embodiments of the present disclosure, it is to be understood that the terms "install", "interconnect", "connect" are broadly understood, unless otherwise expressly defined and defined. For example, it may be a fixed connection, either detachably connected or integrally connected. They may be mechanically connected, may also be electrically connected or may communicate with each other. They may be directly connected or indirectly connected by intermediate media. They may be an internal connected between two elements or maybe an interactive relationship between two elements. The specific meaning of the above terms in embodiments of the present disclosure may be understood by ordinary skilled persons in the art according to a specific situation.

In the description of this specification, the description of the terms such as "one embodiment", "some embodiments", "illustrative embodiments", "examples", "specific examples", or "some examples", are referred to combine specific characteristics, structures, materials, or features described in at least one embodiment or example of the present disclosure. In the present specification, the schematic expression of the above-mentioned terminology does not necessarily refer to the same embodiment or example. Moreover, the particular characteristics, structures, materials, or features described may be combined in any one suitable embodiment or example in suitable manners.

Any process or method described by the flow chart or otherwise described herein, may be understood to mean a module, a fragment, or a portion of one or more codes that are used to executable instructions for implementing a particular logical function or process. Furthermore, the scope of the embodiments of the present disclosure includes additional implementations, which may not be performed according to a sequence that is shown or discussed, and includes performing functions according to a substantially simultaneous manner or the reverse order based on the functions related. That is understood by ordinary skilled persons in the art to embodiments of the present disclosure.

The logic and/or blocks represented in the flowcharts, or otherwise described herein, for example, may be considered as a sequence list of executable instructions for implementing logical functions, which may be implemented in any computer-readable medium, to use in instruction executing systems, devices, or equipment (e.g., a computer-based system, a system including a processing module, or other systems that may take instructions from the instruction executing systems, devices, or equipment and execute instructions), or in conjunction with these instruction executing systems, devices, or equipment to use. For the present specification, "computer-readable mediums" may be anyone that may contain, store, communicate, propagate, or transmit a program, to be used by instruction executing systems, devices, or equipment, or, devices used in conjunction with such instruction executing systems, devices, or equipment. A more specific example (non-exhaustive list) of computer-readable mediums includes the following: electrical connections (electronic apparatuses) with one or more wirings, portable computer disk cartridges (magnetic devices), a random access memory (RAM), a read only memory (ROM), an erasable programmable read only memory (EPROM or flash memory), an optical fiber device, and a compact disc read-only memory (CDROM). In addition, the computer-readable mediums may even be a paper or other suitable mediums on which the program may be printed, as, for example, by optical scanning of paper or other mediums, followed by editing, interpretation or, if necessary, use other suitable process to electrically obtain the program, and then store it in a computer memory.

Each part of embodiments of the present disclosure may be implemented in hardware, software, firmware, or a combination thereof. In the above embodiments, the plurality of block s or methods may be stored in the memory and implemented via software or firmware executed by the suitable instruction executing system. For example, if implemented in hardware, as in another embodiment, may be implemented by any one of the following techniques known in the art or a combination thereof, such as discrete logic circuits having logic gate circuits for implementing logical functions of data signals, specific integrated circuits, programmable gate arrays (PGA), field programmable gate arrays (FPGAs) with suitable combinational logic gates, and the like.

It will be understood by an ordinary skilled person in the art that all or a part of the blocks carried out by the method of the embodiments above described may be accomplished by a program that commands the associated hardware, the program may be stored in a computer readable storage medium. When the program is executed, the program includes one of the blocks of the method embodiment or a combination thereof.

In addition, the functional units in the various embodiments of the present disclosure may be integrated into a processing module, or may be physically present as each of units, or may be integrated two or more units in one module. The above-mentioned integrated module can be implemented in the form of hardware, or in the form of software function modules. The integrated module may also be stored in a computer-readable storage medium, if the integrated module is implemented in the form of a software function module and is sold or used as an independent product.

The above-mentioned storage medium may be a read-only memory, a magnetic disk, or an optical disk.

While the embodiments of the present disclosure have been shown and described above, it is to be understood that the above-described embodiments are exemplary and are not to be construed as limiting the present disclosure. The above-described embodiments may be changed, modified, substituted, and transformed within the scope of the present disclosure by an ordinary skilled person in the art.

What is claimed is:

1. A control method configured to control an electronic apparatus, the electronic apparatus including an imaging device, the method comprising:

determining whether the imaging device is in focus when an imaging command is received;

deciding a threshold of an imaging wait time based on a current frame rate of the imaging device and a preset focusing frame number when the imaging device is not in focus;

controlling a focusing process of the imaging device when the imaging wait time is less than the threshold; and controlling the imaging device for imaging when the imaging wait time is greater than or equal to the threshold;

wherein the imaging device comprises a focusing lens and a motor configured to implement focusing by driving the focusing lens to move between a proximal focus location and a distal focus location along an axis of light, and wherein controlling the focusing process of the imaging device when the imaging wait time is less than the threshold comprises:

controlling the motor to drive the focusing lens to perform a focus searching process by moving gradually according to a plurality of first stages from the proximal focus location to the distal focus location;

processing a buffering image corresponding to each of the first stages of the focusing lens, to determine whether a first inflection point appears in a plurality of contrast ratios of the buffering images;

controlling the motor to drive the focusing lens returning one step and moving with a plurality of second stages to the distal focus location when the first inflection point appears, wherein the second stages are less than the first stages;

processing the buffering image corresponding to each of the second stages of the focusing lens, to determine whether a second inflection point appears in the contrast ratios of the buffering images; and deciding the imaging device to focus when the second inflection point appears.

2. The control method as claimed in claim 1 further comprising:
controlling the imaging device for imaging when the imaging device is in focus.

3. The control method as claimed in claim 1, wherein deciding the threshold of the imaging wait time based on the current frame rate of the imaging device and the preset focusing frame number comprises:
calculating the current frame rate based on an exposure time;
acquiring the preset focusing frame number; and
calculating the threshold based on the current frame rate and the preset focusing frame number.

4. The control method as claimed in claim 1, wherein when the imaging wait time is less than the threshold, the control method further comprises determining whether the imaging device is in focus.

5. The control method as claimed in claim 4, wherein when the imaging wait time is less than the threshold, the control method further comprises controlling the imaging device for imaging when the imaging device is in focus.

6. A control device configured to control an electronic apparatus, the electronic apparatus including an imaging device, wherein the control device comprises a processor and a memory comprising at least one program instruction executable by the processor connected with the memory, the control device comprising:
a first determination module configured to cause the processor to determine whether the imaging device is in focus when an imaging command being received;
a decision module configured to cause the processor to decide a threshold of an imaging wait time based on a current frame rate of the imaging device and a preset focusing frame number when the imaging device being not in focus;
a first control module configured to cause the processor to control a focusing process of the imaging device when the imaging wait time is less than the threshold; and
a second control module configured to cause the processor to control the imaging device for imaging when the imaging wait time being greater than or equal to the threshold;
wherein the imaging device has a focusing lens and a motor configured to implement a focusing by driving the focusing lens to move between a proximal focus location and a distal focus location along an axis of light, and the first control module comprises:
a first control unit configured to cause the processor to control the motor to drive the focusing lens to perform a focus searching process by moving gradually according to a plurality of first stages from the proximal focus location to the distal focus location;
a first processing unit configured to cause the processor to process a buffering image corresponding to each of the first stages of the focusing lens, to determine whether a first inflection point appears in a plurality of contrast ratios of the buffering images;
a second control unit configured to cause the processor to control the motor to drive the focusing lens returning one stage and moving with a plurality of second stages to the distal focus location when the first inflection point appears, wherein the second stages are less than the first stages;
a second processing unit configured to cause the processor to process the buffering image corresponding to each of the second stages of the focusing lens, to determine whether a second inflection point appears in the contrast ratios of the buffering images; and
a decision unit configured to cause the processor to decide the imaging device to focus when the second inflection point appears.

7. The control device as claimed in claim 6 further comprising a third control module configured to cause the processor to control the imaging device for imaging when the imaging device is in focus.

8. The control device as claimed in claim 6, wherein the decision module comprises:
a first calculation unit configured to cause the processor to calculate the current frame rate based on an exposure time;
an acquirement unit configured to cause the processor to acquire the preset focusing frame number; and
a second calculation unit configured to cause the processor to calculate the threshold based on the current frame rate and the preset focusing frame number.

9. The control device as claimed in claim 6 further comprising a second determination module configured to cause the processor to determine whether the imaging device is in focus.

10. The control device as claimed in claim 9 further comprising a fourth control module configured to cause the processor to control the imaging device for imaging when the imaging device is in focus.

11. An electronic apparatus, comprising:
an imaging device; and
a control device electrically connected with the imaging device, wherein the control device comprises a processor and a memory comprising at least one program instruction executable by the processor connected with the memory, the control device comprising:
a first determination module configured to cause the processor to determine whether the imaging device is in focus when an imaging command being received;
a decision module configured to cause the processor to decide a threshold of an imaging wait time based on a current frame rate of the imaging device and a preset focusing frame number when the imaging device being not in focus;
a first control module configured to cause the processor to control a focusing process of the imaging device when the imaging wait time is less than the threshold; and
a second control module configured to cause the processor to control the imaging device for imaging when the imaging wait time being greater than or equal to the threshold;
wherein the imaging device has a focusing lens and a motor configured to implement a focusing by driving the focusing lens to move between a proximal focus location and a distal focus location along an axis of light, and the first control module comprises:
a first control unit configured to cause the processor to control the motor to drive the focusing lens to perform a focus searching process by moving gradually according to a plurality of first stages from the proximal focus location to the distal focus location;
a first processing unit configured to cause the processor to process a buffering image corresponding to each of the first stages of the focusing lens, to determine whether a first inflection point appears in a plurality of contrast ratios of the buffering images;
a second control unit configured to cause the processor to control the motor to drive the focusing lens returning one stage and moving with a plurality of second stages to the distal focus location when the first inflection point appears, wherein the second stages are less than the first stages;

a second processing unit configured to cause the processor to process the buffering image corresponding to each of the second stages of the focusing lens, to determine whether a second inflection point appears in the contrast ratios of the buffering images; and a decision unit configured to cause the processor to decide the imaging device to focus when the second inflection point appears.

12. The electronic apparatus as claimed in claim 11, wherein the control device further comprises a third control module configured to cause the processor to control the imaging device for imaging when the imaging device is in focus.

13. The electronic apparatus as claimed in claim 11, wherein the decision module comprises:

a first calculation unit configured to cause the processor to calculate the current frame rate based on an exposure time;

an acquirement unit configured to cause the processor to acquire the preset focusing frame number; and a second calculation unit configured to cause the processor to calculate the threshold based on the current frame rate and the preset focusing frame number.

14. The electronic apparatus as claimed in claim 11, wherein the control device further comprises a second determination module configured to cause the processor to determine whether the imaging device is in focus.

15. The electronic apparatus as claimed in claim 14, wherein the control device further comprises a fourth control module configured to cause the processor to control the imaging device for imaging when the imaging device is in focus.

\* \* \* \* \*